United States Patent
Mueller et al.

(10) Patent No.: US 8,708,521 B2
(45) Date of Patent: Apr. 29, 2014

(54) PANE ASSEMBLY

(75) Inventors: Marco Mueller, Waldfeucht (DE); Rino Messere, Modave (BE); Henning Haase, Weissensberg (DE)

(73) Assignee: Saint-Gobain Glass France, Courbevoie (FR)

( * ) Notice: Subject to any disclaimer, the term of this patent is extended or adjusted under 35 U.S.C. 154(b) by 386 days.

(21) Appl. No.: 13/143,083

(22) PCT Filed: Apr. 19, 2010

(86) PCT No.: PCT/EP2010/055097
§ 371 (c)(1),
(2), (4) Date: Jun. 30, 2011

(87) PCT Pub. No.: WO2010/124951
PCT Pub. Date: Nov. 4, 2010

(65) Prior Publication Data
US 2011/0267816 A1 Nov. 3, 2011

(30) Foreign Application Priority Data
Apr. 30, 2009 (DE) .......................... 10 2009 019 623

(51) Int. Cl.
*H01L 33/48* (2010.01)
*F21V 7/00* (2006.01)

(52) U.S. Cl.
USPC ................. 362/235; 362/800; 362/249.02

(58) Field of Classification Search
USPC ................... 362/235, 249.02, 800
See application file for complete search history.

(56) References Cited

U.S. PATENT DOCUMENTS

| 6,074,074 | A | 6/2000 | Marcus |
| 8,289,814 | B2 * | 10/2012 | Chien ............... 368/80 |
| 8,305,846 | B2 * | 11/2012 | Chien ............... 368/10 |
| 2004/0040228 | A1 | 3/2004 | Emde et al. |
| 2007/0133222 | A1 | 6/2007 | Watanabe et al. |
| 2008/0049168 | A1 | 2/2008 | Kubota |
| 2008/0316741 | A1 | 12/2008 | Lee |

FOREIGN PATENT DOCUMENTS

| DE | 29510238 | 12/1995 |
| DE | 19852593 | 5/2000 |
| DE | 10224421 | 4/2004 |
| DE | 10 2004 035756 | 2/2006 |
| DE | 202006006051 | 6/2006 |
| EP | 0818652 | 1/1998 |
| EP | 1346178 | 11/2004 |
| EP | 1998103 | 12/2008 |
| JP | 2007-036044 | 2/2007 |
| WO | 98/10219 | 3/1998 |
| WO | 2008/007297 | 1/2008 |

OTHER PUBLICATIONS

PCT International Search Report for PCT/EP2010/055097 filed on Apr. 19, 2010 in the name of Saint-Gobain Glass France.
PCT Written Opinion for PCT/EP2010/055097 filed on Apr. 19, 2010 in the name of Saint-Gobain Glass France (German and English).

* cited by examiner

*Primary Examiner* — Anabel Ton
(74) *Attorney, Agent, or Firm* — Steinfl & Bruno LLP

(57) ABSTRACT

A pane assembly having an illumination system, comprising at least: a pane, an LED light strip attached on the edge of the pane by a connecting piece wherein the LED light strip comprises at least an LED circuit board an LED, an electrical connecting cable, a polymer sheath of the LED circuit board, the LED and of the electrical connection cable and a reflector being arranged to the pane.

20 Claims, 3 Drawing Sheets

PANE ASSEMBLY

CROSS REFERENCE TO RELATED APPLICATIONS

Figure 1:
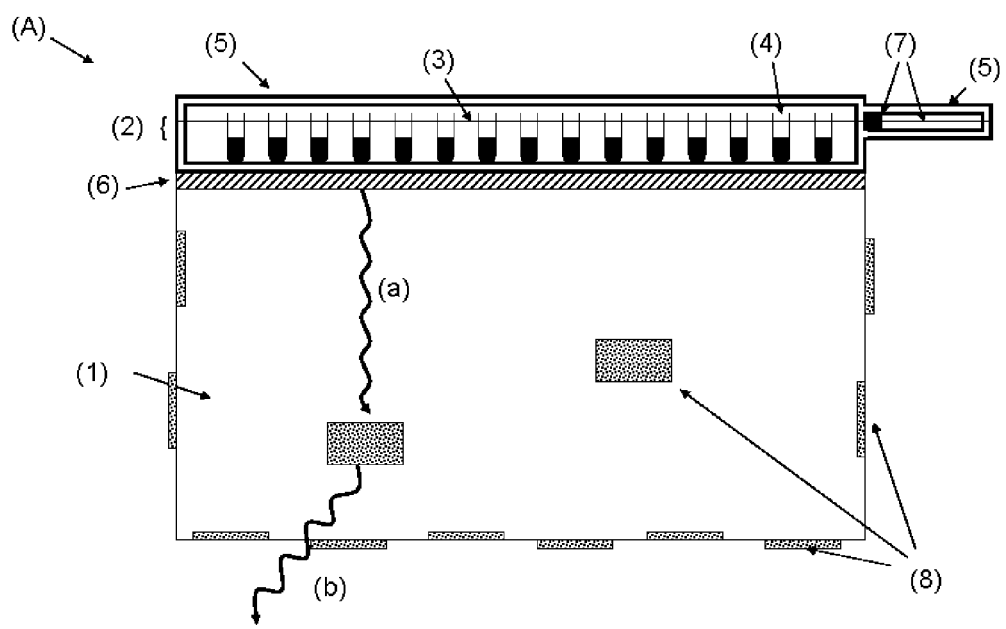

The present application is the US national stage of International Application PCT/EP2010/055097 filed on Apr. 19, 2010 which, in turn, claims priority to German Application 10 2009 019 623.4, filed on Apr. 30, 2009.

The invention relates to a pane assembly with illumination, a method for its production, and its use.

Illuminated pane assemblies include panes and lighting means mounted directly on the edge of the pane. Raised reflective elements on the surface of the pane enable the illumination of the pane area. Thus, interior spaces and also building façades can be very uniformly lighted. Illuminated pane assemblies are found in a large number of areas of application inside and outside of buildings and motor vehicles.

In contrast to a point light source such as a floor lamp or ceiling lamp, a very uniform, area light can be generated by an illuminated pane assembly. Depending on the illumination source and the activation electronics used, different light effects can also be realized. In particular, with the use of colored LEDs, different color effects can be combined. Thus, moving light effects can be generated through targeted activation and extinguishing of individual LEDs. For the observer, the light seems to spread out in waves of color. If multiple waves of color overlay each other, further effects such as a colored moiré effect are produced. These light and color effects can also be used for advertising spaces or to produce artistic and architectonic effect.

The attachment of lighting means such as LEDs normally occurs in rigid LED strips. The LEDs attached one behind another are attached on the LED circuit board in a fixed plastic or metal housing on the pane. Due to the different material properties of the LED strips thus obtained and the pane, attachment is often difficult to realize. If, in addition, the geometries of the pane and the LED strip deviate only slightly from each other, permanent attachment is made even more difficult. Tolerances in attachment, in particular to the electrical connections and to the wire, also create, in many cases, unsealed points through which moisture can penetrate. In many cases, this moisture causes electrical shorts and makes time-consuming and costly repairs necessary.

DE 295 10 238 U1 discloses a window with light projecting means or light guides mounted in the edge region. Reflectors (light deflecting means) mounted on the window enable enable deflection of the light coupled into the window. Possible light sources include incandescent bulbs, fluorescent tubes, or LEDs.

DE 198 52 593 A1 discloses an area light with transparent glazing. When the light source is turned off, the pane is transparent. When the light source is turned on, the glazing functions as an area light.

DE 102 24 421 A1 discloses a light wall with lamps that is arranged behind a computer workstation. The light wall consists of a transparent glass or plastic pane preferably illuminated by LEDs. The brightness and color components can be regulated by a control unit. The control unit can be directly connected to the PC of the computer workstation and can regulate the brightness of the workstation as a function of the brightness of the monitor.

DE 20 2006 006 051 U1 discloses a motor vehicle rear window. Light sources that enable lighting up a symbol mounted on the pane are arranged on the edge of the glass pane.

EP 1 346 178 B1 discloses a sandwich-like panel element. The two panels are largely transparent to light. Solar cell elements are mounted in the intermediate space of the panel or on the panels. A light source is arranged on the front side of at least one panel and enables additional illumination.

Additional illumination units with LEDs are also found in DE 10 2004 035 756 A1, EP 1 998 103 A1, US 2008/0316741 A1, and JP 2007-036044 A.

The object of the invention is to provide an illuminated pane assembly that permits a tight, moisture-impermeable, simultaneously flexible attachment of the LED light strip on the pane.

The object of the present invention is accomplished according to the invention by means of a pane assembly with illumination, a method for its production, and its use according to the independent claims 1, 11, 12 and 15. Preferred embodiments are presented in the dependent claims.

The illuminated pane assembly comprises at least a pane, a connecting piece, and an LED light strip attached on the edge of the pane by the connecting piece. The pane contains materials such as glass and/or transparent polymers. Preferably, the pane has an optical transparency of >85%. In principle, various geometries of the pane are possible, e.g., rectangular, trapezoidal, and rounded geometries.

The connecting piece connects and attaches the LED light strip to the pane. The connecting piece has, preferably, an optical transparency comparable to the pane. The connecting piece comprises, preferably, a thin, adhesive, and/or clinging polymer film. The thickness of the connecting piece is, preferably, less than 5 mm, particularly preferably, less than 1 mm. Preferably, the connecting piece has a similar and/or identical composition to the polymer sheath of the LED strip described below.

The LED light strip comprises at least an LED circuit board, an LED, an electrical connecting cable, and a polymer sheath. The LED circuit board comprises commercially available circuit boards and/or cards. These are made of electrically insulating materials on which electrical connections are applied. Examples of insulating materials include nonconductive polymers such as epoxy-resin-impregnated glass fibers, Teflon, ceramic, and/or polyester film. The electrical connections (for example, conducting wires) contain preferably copper, iron, tin, nickel, gold, and/or silver. The LEDs are attached on the LED circuit boards and make contact through the electrical connections. The electrical connecting cable represents the connection to the power source. Preferably, a control device is also arranged between the electrical connecting cable and the power source. This control device enables targeted illumination of individual LEDs. Through the arrangement of different colored LEDs on the LED circuit board, colored light effects can be generated. The entire arrangement of the components of the LED light strip comprising the LED circuit board, LEDs, and electrical connecting cable is located inside a polymer sheath. The preferably completely closed polymer sheath seals the components and prevents the penetration of moisture and contaminants. Depending on the chemical composition and the thickness of the polymer sheath, the LED light strip is flexible and can be attached even on rounded panes. On the output side of the light of the LEDs, the polymer sheath preferably has a high-gloss surface.

A reflector mounted on the pane reflects the light coupled into the pane from the LED light strip toward the outside. If only individual reflectors are mounted on the pane, the pane lights only in the region of the reflectors. If the entire pane surface is provided with reflectors, the entire pane lights accordingly.

The connecting piece preferably includes a double-sided, optically transparent adhesive tape. The selection of the adhesive on the adhesive tape is determined by the material of the pane or the polymer sheath.

The optically transparent adhesive tape preferably includes, on the side facing the polymer sheath, a silicone-based adhesive and, on the side facing the pane, an acrylate-based adhesive. Thus, for example, a polymer sheath made of silicone can be firmly bonded to a pane made of glass or polyacrylic.

The optically transparent adhesive tape is preferably activated by a corona discharge. Polar molecules or molecular fractions that enable improved adhesion on the adhesive tape develop on the surface of the adhesive tape. In addition to polar molecules, radical molecular fragments or ions can develop on the surface of the activated adhesive tape.

The pane includes preferably one of the materials glass and/or polymer, particularly preferably flat glass and/or polymethyl methacrylate.

The pane has preferably an area of >0.2 $m^2$, particularly preferably of >1 $m^2$ and even more preferably of >5 $m^2$ auf.

The polymer sheath contains preferably silicones, polyisoprenes, styrene butadiene rubber, butadiene acrylonitrile rubber, and/or polyacrylates as well as mixtures and/or copolymers thereof.

The silicones include preferably RTV (room-temperature vulcanizing) silicone rubber, HTV (you can vulcanizing) silicone rubber, peroxide vulcanizing silicone rubber, 2 component LSR (liquid silicone rubber) silicone rubber, and/or addition vulcanizing silicone rubber as well as mixtures and/or copolymers thereof.

The polymer sheath has, preferably, an optical transparency of >60%, preferably of >75%, and particularly preferably of >85% auf.

The polymer sheath preferably comprises an extruded silicone molded body. The extruded silicone molded body is preferably made from a highly transparent peroxide vulcanizing silicone rubber and/or addition vulcanizing silicone rubber. The optical transparency is preferably >75% and particularly preferably >85%. The extruded silicone molded body can be prefabricated separately. The LEDs, LED circuit boards, and the electrical connecting cable can be inserted later into the extruded silicone molded body and the silicone molded body can be sealed.

The polymer sheath preferably includes UV stabilizers and preservatives. Examples of UV stabilizers are hydroxy benzophenone and dialkyldithiocarbamate.

The connecting piece includes, preferably, acrylate adhesives, methyl methacrylate adhesives, cyanoacrylate adhesives, polyepoxies, silicone adhesives, and/or silane cross-linking polymer adhesives as well as mixtures and/or copolymers thereof.

The connecting piece has, preferably, an optical transparency of >80% and, particularly preferably, of >90%.

The LEDs preferably include both LEDs (light emitting diodes) and OLEDs (organic light emitting diodes).

The LEDs preferably have a distance from the pane of <1 mm, particularly preferably <0.5 mm.

The reflector preferably comprises structures for diffusion of light, particularly preferably, particles, dot patterns, stickers, deposits, indentations, incisions, line patterns, overprints, and/or silkscreen prints.

The LED circuit board includes, preferably, silver, copper, tin, nickel, gold, aluminum, iron, tungsten, and/or chromium and/or an electrically conductive adhesive tape.

The invention further comprises a method for production of the illuminated pane assembly. In a first step, LEDs and an electrical connecting cable are mounted on an LED circuit board. This can be done, for example, by plugging in and/or soldering. The LED array thus obtained is inserted into a mold. The mold predetermines the later dimensions of the LED light strip. The mold is then filled with a raw polymer sheath. The raw polymer sheath preferably includes a high-temperature or addition vulcanizing silicone. The polymer sheath filled [into the mold] cures (vulcanizes) to form the polymer sheath, depending on the high-temperature or addition vulcanizing silicone used, at temperatures from 120° C. to 250° C. The LED light strip obtained is connected to the pane by means of a connecting piece. The connecting piece is preferably manufactured from a liquid, curable silicone and, after curing, connects the pane and the LED light strip.

In an alternative method for production of the illuminated pane assembly according to the invention, in a first step, LEDs and an electrical connecting cable are mounted on an LED circuit board. This can be done, for example, by plugging in, gluing, and/or soldering. The LED array obtained is inserted into a polymer sheath. The polymer sheath preferably contains a peroxide or addition vulcanizing silicone rubber. The polymer sheath is designed such that it accommodates the LED array in a groove and is open toward the back. The LED array is inserted through the opening. Preferably, profile grooves can be mounted on the lateral edges of the polymer sheath. The profile grooves enable the mounting of an additional reflector made of metal or silicone. On the output side of the light of the LEDs, the polymer sheath preferably has a high-gloss surface. The polymer sheath is then sealed. The sealing is preferably done with an optically transparent polymer, e.g., an RTV silicone rubber. The LED light strip obtained is connected to the pane by means of a connecting piece.

The connecting piece is preferably manufactured from a liquid, curable silicone and, after curing, attaches the LED light strip on the pane.

The electrical connecting cable of the LED light strip is preferably completely provided with a polymer sheath that ensures complete sealing of the polymer sheath of the LED light strip.

The connecting piece preferably comprises a double-sided, optically transparent adhesive tape. The adhesive tape is particularly preferably provided on one side with a silicone-containing adhesive and on the other side with an acrylate-containing adhesive.

The connecting piece, as well as the regions of the pane in contact with the connecting piece and/or the polymer sheath, are preferably activated by plasma treatment, irradiation, and/or corona treatment. Polar molecules or molecular fractions that enable improved adhesion on the adhesive tape develop on the surface of the adhesive tape. In addition to polar molecules, radical molecular fragments or ions can develop on the surface of the activated adhesive tape.

The invention further includes the use of the illuminated pane assembly as building interior illumination, building exterior illumination, advertising media, and/or a motor vehicle pane.

In the following, the invention is explained in detail with reference to drawings and an exemplary embodiment as well as a comparative example. The drawings are purely schematic representations and are not to scale. They in no way restrict the invention.

An exemplary embodiment of the invention is depicted in the drawings and is described in detail in the following.

Figure 2:
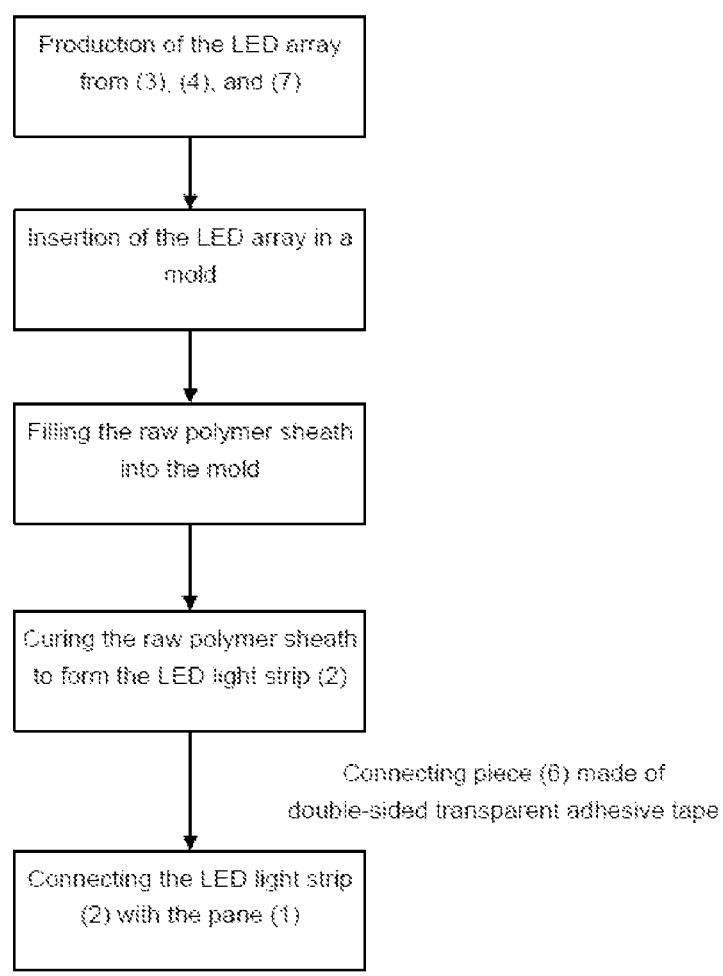
Figure 3:
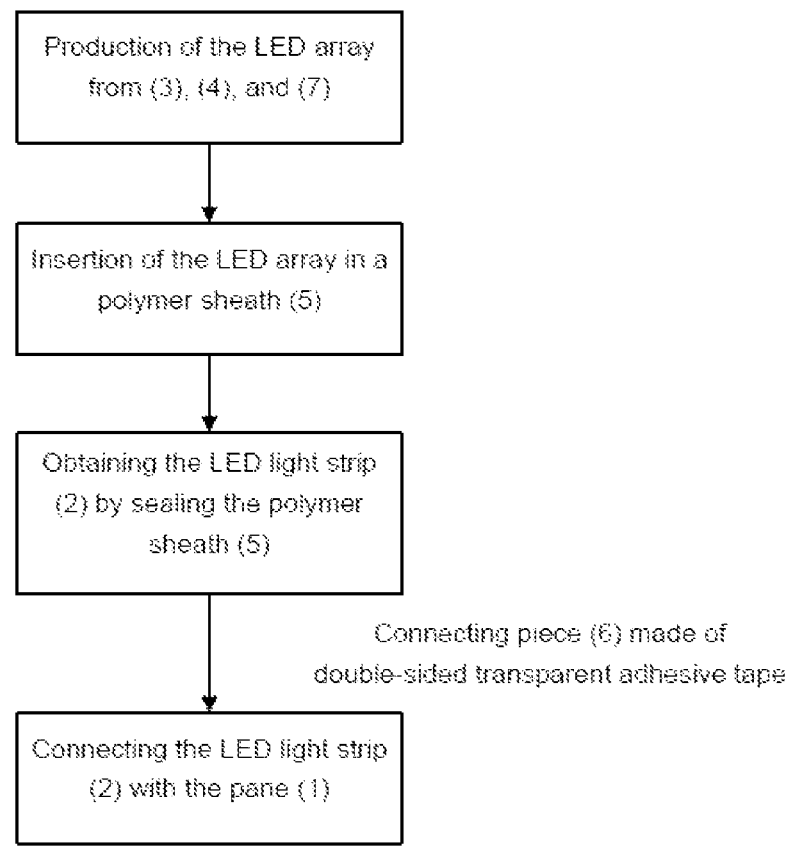

The drawings depict:

FIG. 1 a cross-section of the illuminated pane assembly according to the invention, FIG. 2 a schematic representation of the flowchart of a preferred embodiment of the method according to the invention for production of the illuminated pane assembly, FIG. 3 a schematic representation of the flowchart of another embodiment of the method according to the invention for production of an illuminated pane assembly.

FIG. 1 depicts a cross-section of the pane assembly (A) according to the invention. The LED light strip (2) comprises at least one LED circuit board (3) and LEDs (4) mounted thereon. The electrical connection (7) supplies the LED circuit board (3) with power. The LED light strip (2) has a polymer sheath (5). The polymer sheath (5) made of an optically transparent polymer seals the LED light strip (2) against its surroundings. The LED light strip (2) is connected to the edge of the pane (1) by a connecting piece (6). The connecting piece includes a double-sided, transparent adhesive tape. The light (a) shining from the LED light strip into the pane (1) is radiated out of the pane (1) as reflected light (b) by reflectors (8) mounted on the pane (1).

FIG. 2 depicts a flowchart of a preferred embodiment for production of the illuminated pane assembly (A) according to the invention. In a first step, LEDs (4) and an electrical connecting cable (7) are mounted on an LED circuit board (3). This can be done, for example, by plugging in, gluing, and/or soldering. The LED array produced is inserted into a mold. Here, the temperature resistance of the mold must be selected above the vulcanization temperature of the silicone used. The mold used is preferably designed such that it has a high-gloss surface on the output surface of the light of the enclosed LEDs.

The mold is then filled with a raw polymer sheath. The raw polymer sheath includes an optically transparent HTV silicone with a Shore hardness between 30 Shore A and 90 Shore A. Alternatively, an optically transparent 2 component LSR (liquid silicone rubber) silicone rubber with a Shore hardness between 30 Shore A and 90 Shore A can also be used. A definition of the Shore hardness for elastomers is found in DIN 53505 and DIN 7868. The raw polymer filled [into the mold] vulcanizes (cures), depending on the high-temperature or addition vulcanizing silicone used, preferably at temperatures from 160° C. to 200° C. and a clamp force of 150 kN to 250 kN.

The LED light strip (2) obtained is connected by a connecting piece (6) made of double-sided, optically transparent adhesive tape (6) to a pane (1) made of glass. The adhesive tape (6) includes, on the side facing the LED light strip (2), a silicone-containing adhesive. The adhesive tape includes, on the side facing the pane (1), an acrylate-based adhesive. The adhesive tape can also be processed and activated by a corona discharge. The duration and intensity of the corona discharge are adapted to the size of the adhesive tape and the type of adhesive used on the adhesive tape.

FIG. 3 depicts a flowchart of another method of production of the illuminated pane arrangement (A) according to the invention. In a first step, LEDs (4) and an electrical connecting cable (7) are mounted on an LED circuit board (3). This can be done, for example, by plugging in and/or soldering. The LED array obtained is inserted into a polymer sheath (5). The polymer sheath (5) includes a peroxide or addition vulcanizing silicone rubber. The polymer sheath (5) is open toward the back, such that it can accommodate the LED array in a groove. On the output side of the light of the LEDs, the polymer sheath (5) preferably has a high-gloss surface. The polymer sheath (5) is then sealed. The sealing is done with an optically transparent polymer, e.g., a room-temperature vulcanizing silicone rubber. The electrical connecting cable (7) is provided with a polymer sheath that ensures a complete sealing of the system. The LED light strip (2) obtained is connected, by a connecting piece (6) made of double-sided, optically transparent adhesive tape (6), to a pane (1) made of glass. The adhesive tape (6) includes, on the side facing the LED light strip (2), a silicone-containing adhesive. The adhesive tape (6) includes, on the side facing the pane (1), an acrylate-based adhesive. The adhesive tape (6) can also be activated by a corona discharge. The duration and intensity of the corona discharge are adapted to the size of the adhesive tape (6) and the type of adhesive used on the adhesive tape.

The reference characters mean:
(1) Pane,
(2) LED light strip,
(3) LED circuit board,
(4) LED,
(5) Polymer sheath,
(6) Connecting piece,
(7) Electrical connecting cable.

In the following, the invention is explained in greater detail with reference to an example of the method according to the invention and a comparative example.

The stability and leakproofness of the illuminated pane arrangement (A) according to the invention was tested in two series of tests. To that end, the LED light strips (2) of Example 1 according to the invention and of Comparative Examples 2 and 3 were subjected to a load test under acid conditions and high humidity. The LED light strip (2) (length 450 mm, width 18 mm, and height 11.4 mm) included, in all examples, 72 LEDs (24x blue, 24x red, 24x green). All tests were performed at 100% full load (24 V and 6 25 Watt) of the LEDs. Both the Example 1 according to the invention and the Comparative Example 2 included the same LSR silicone rubber on a polydimethyl siloxane base of Elastosil® LR 3003/60 A and Elastosil® LR 3003/60 B in the weight ratio 1:1 (Wacker Chemie AG, D-70178 Stuttgart). The Comparative Example 3 included no sheath.

EXAMPLE 1

According to the Invention

In a first series of tests in accordance with DIN50018/ISO3231, the LED light strip (2) of the illuminated pane assembly according to the invention was exposed in the turned-on state for 20 days to an SO$_2$ atmosphere.

In a second series of tests in accordance with DIN500167, the LED light strip (2) of the illuminated pane assembly according to the invention was exposed in the turned-on state for 140 days at 50° C. to an atmosphere with 100% humidity.

EXAMPLE 2

Comparative Example

The Comparative Example 2 differs from the illuminated pane assembly according to the invention through the encapsulation of the LED light strip (2) in a rigid aluminum housing. The intermediate space between the aluminum housing and the LED circuit board (3) and LEDs (4) was filled with the same LSR silicone rubber as an Example 1. In contrast to the Example 1 according to the invention, the electrical connecting cable (7) was not provided with a polymer sheath (5). The other dimensions corresponded to Example 1 according to the invention.

In a first series of tests in accordance with DIN50018/ISO3231, the LED light strip (2) of the Comparative Example 2 was exposed in the turned-on state for im 20 days to an SO$_2$ atmosphere.

In a second series of tests in accordance with DIN500167, the LED light strip (2) of the Comparative Example 2 was exposed in the turned-on state for 140 days at 50° C. to an atmosphere with 100% humidity.

EXAMPLE 3

Comparative Example

The Comparative Example 3 differs from the illuminated pane assembly according to the invention through the lack of a sheath of the LED circuit board (3) and LEDs (4). The electrical connecting cable (7) was not provided with a polymer sheath (5). The other dimensions corresponded to Example 1 according to the invention.

In a first series of tests in accordance with DIN50018/ISO3231, the LED light strip (2) of the Comparative Example 3 was exposed in the turned-on state for 20 days to an $SO_2$ atmosphere.

In a second series of tests in accordance with DIN500167, the LED light strip (2) of the Comparative Example 3 was exposed in the turned-on state for 140 days at 50° C. to an atmosphere with 100% humidity.

The results of the Example 1 according to the invention and of the Comparative Examples 2 and 3 are summarized in Table 1.

TABLE 1

Service life of the LED light strip (2) of Example 1 according to the invention and of the Comparative Examples 2 and 3.

| Example | Service Life Test Series 1 | Service Life Test Series 2 |
|---|---|---|
| 1 (according to invention) | >20 days | >140 days |
| 2 (comparative example) | 1 day | >140 days |
| 3 (comparative example) | 1 day | 1 day |

As discernible from Table 1, the service life of the illuminated pane arrangement 1 according to the invention was clearly higher than that of the Comparative Examples 2 and 3. Thus, the maintenance costs to be anticipated for the illuminated pane assembly according to the invention are significantly lower than in the Comparative Example according to the prior art. These results are surprising and unexpected.

The invention claimed is:

1. A pane assembly with illumination, comprising:
   i) a pane;
   ii) a connecting piece;
   iii) an LED light strip attached on an edge of the pane with the connecting piece, wherein the LED light strip comprises:
      an LED circuit board;
      an LED;
      an electrical connecting cable; and
      a polymer sheath encasing the LED circuit board, the LED, and the electrical connection cable, and
   iv) a reflector mounted on the pane.

2. The pane assembly according to claim 1, wherein the connecting piece comprises a double-sided, optically transparent adhesive tape.

3. The pane assembly according to claim 2, wherein the optically transparent adhesive tape comprises a silicone containing adhesive on a side facing the LED light strip, and an acrylate-based adhesive on a side facing the pane.

4. The pane assembly according to claim 2, wherein the optically transparent adhesive tape is activated by a corona discharge.

5. The pane assembly according to claim 1, wherein the polymer sheath comprises a compound selected from the group consisting of at least one of:
   i) silicones,
   ii) polyisoprenes,
   iii) styrene-butadiene rubber,
   iv) butadiene acrylonitrile rubber,
   v) polyacrylates,
   vi) mixtures of any one of compounds i)-v), and
   vii) copolymers of any one of compounds i)-v).

6. The pane assembly according to claim 5, wherein the silicones are selected from the group consisting of at least one of:
   i) RTV silicone rubber,
   ii) HTV silicone rubber,
   iii) peroxide vulcanizing silicone rubber,
   iv) vulcanizing silicone rubber,
   v) mixtures of any one of silicones i)-iv), and
   vi) copolymers of any one of silicones i)-iv).

7. The pane assembly according to claim 1, wherein the polymer sheath has an optical transparency of greater than 60%.

8. The pane assembly according to claim 1, wherein the polymer sheath comprises an extruded silicone molded body.

9. The pane assembly according to claim 1, wherein the connecting piece comprises a compound selected from the group consisting of at least one of:
   i) acrylate adhesives,
   ii) methyl methacrylate adhesives,
   iii) cyanoacrylate adhesives,
   iv) polyepoxies,
   v) silicone adhesives,
   vi) silane-cross-linked polymer adhesive,
   vii) mixtures of any one of compounds i)-vi), and
   viii) copolymers of any one of compounds i)-vi).

10. The pane assembly according to claim 1, wherein the connecting piece has an optical transparency of greater than 80%.

11. A method of producing a pane assembly with illumination comprising:
   mounting at least one LED and an electrical connecting cable on an LED circuit board to produce an LED array;
   inserting the LED array into a mold;
   filling a raw polymer sheath into the mold;
   curing the raw polymer sheath to a polymer sheath and to produce an LED light strip; and
   connecting an LED light strip to one edge of a pane by a connecting piece.

12. A method of producing a pane assembly with illumination comprising:
   mounting at least one LED and an electrical connecting cable on an LED circuit board to produce an LED array;
   inserting the LED array into a polymer sheath;
   sealing the polymer sheath to produce an LED light strip; and
   connecting the LED light strip to one edge of a pane by a connecting piece.

13. The method according to claim 11, wherein the connecting piece is a double-sided, transparent adhesive tape.

14. The method according to claim 11, wherein the connecting piece, the pane, and/or the polymer sheath are activated by plasma treatment, irradiation, and/or corona treatment.

15. A method of using the pane assembly according to claim 11, the method selected from the group consisting of: illuminating an interior of a building, illuminating an exterior of a building, advertising media, and/or illuminating a motor vehicle pane.

16. The method according to claim 12, wherein the connecting piece is a double-sided, transparent adhesive tape.

17. The pane assembly according to claim 1, wherein the polymer sheath has an optical transparency of greater than 75%.

18. The pane assembly according to claim 1, wherein the polymer sheath has an optical transparency of greater than 85%.

19. The pane assembly according to claim 1, wherein the connecting piece has an optical transparency of greater than 90%.

20. The method according to claim 12, wherein the connecting piece, the pane, and/or the polymer sheath are activated by plasma treatment, irradiation, and/or corona discharge.

* * * * *